United States Patent [19]
De'Longhi

[11] Patent Number: 6,085,641
[45] Date of Patent: Jul. 11, 2000

[54] APPARATUS FOR FRYING FOOD PRODUCTS

[75] Inventor: Giuseppe De'Longhi, Treviso, Italy

[73] Assignee: De'Longhi S.p.A., Treviso, Italy

[21] Appl. No.: 09/233,596

[22] Filed: Jan. 19, 1999

[30]     Foreign Application Priority Data

Jan. 23, 1998 [IT] Italy ................................ MI980037 U

[51] Int. Cl.⁷ ..................................................... A47J 37/12

[52] U.S. Cl. .................. 99/408; 99/403; 99/446

[58] Field of Search ............................. 99/408, 403, 446, 99/407

[56]     References Cited

U.S. PATENT DOCUMENTS

| 2,287,396 | 6/1942 | Roth ...................................... 99/403 X |
| 2,610,740 | 9/1952 | Hunter .................................. 99/408 X |
| 3,210,193 | 10/1965 | Martin ................................... 99/408 X |
| 4,945,893 | 8/1990 | Manchester ........................... 99/408 X |

*Primary Examiner*—Reginald L. Alexander
*Attorney, Agent, or Firm*—Herbert Dubno

[57]     ABSTRACT

There is described apparatus for frying food products of the type which has a casing including a basin for holding oil for frying the food product. The apparatus of the invention is characterized in that it includes draining device for draining the oil from the basin and collecting device for collecting the oil drained from the basin.

12 Claims, 3 Drawing Sheets

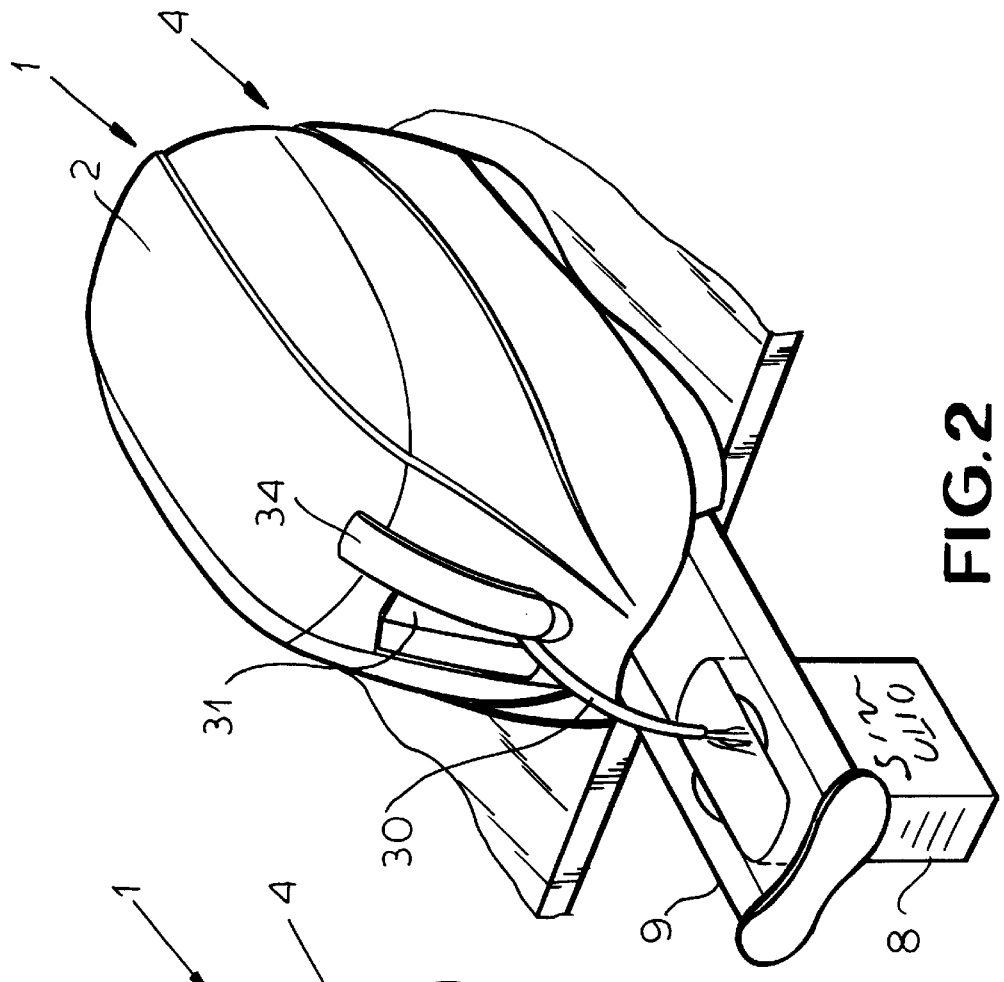
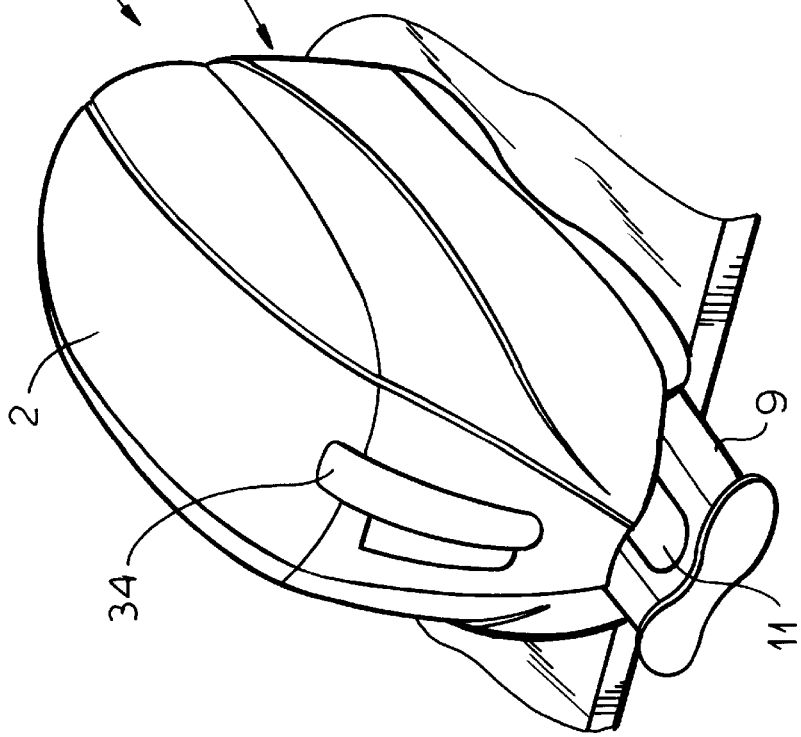
FIG.1
FIG.2

6,085,641

APPARATUS FOR FRYING FOOD PRODUCTS

FIELD OF THE INVENTION

The present invention relates to apparatus for frying food products.

BACKGROUND OF THE INVENTION

As is known, current apparatus for frying food products, used predominantly in domestic environments, consists of a casing provided with a lid which allows access to a basin for holding the oil used for cooking the food, product.

Within the basin, which can either be fixed to the body of the apparatus or removable from the apparatus, there is a metal basket which allows the fried product to be drained and removed from the basin of the apparatus or the fryer.

Depending on the type of frying undertaken, it is necessary, at varying time intervals, to change or filter the oil held in the basin of the fryer either to remove any impurities from the oil, or because the oil is so used that it is no longer able to properly fry the product immersed in the oil. In one of these situations the user of the fryer has, normally, to wait until the oil in the basin has almost completely cooled down, in order to avoid any danger of burning, lift the cover from the fryer, and, in the case of a removable basin, remove the basin from the body of the fryer and drain all the oil needing to be filtered or changed into a container.

In the case ox a fixed basin, in order to drain the oil from the basin itself, it is even necessary to lift the whole fryer and turn it upside downs, which is not easy.

Normally the container, into which the oil is drained, is very unstable in that it can easily topple over and it is not always of a suitable shape to receive stably the oil filtering element which is often of inadequate dimensions, which causes much difficulties to the user during such an operation.

Clearly, from what has been mentioned above,. it is easy to understand how, over and above the possible danger of burning while draining the oil from the basin, such an operation is not always easy for the user to carry out and may result in the fryer and surrounding areas being soiled.

In addition, the removal and reassembly of the basin to the body of the fryer is not always easy.

OBJECTS OF THE INVENTION

It is the object of this invention to provide an improved fryer free from the above highlighted inconveniences of the known technology.

A proposed technical aim behind this invention, is to solve the above highlighted inconveniences of the known technology.

It is another object of this invention to provide apparatus for frying food products, which allows the oil contained within its basin to be drained in a quick and simple manner, into a container of high stability and which is already fitted with a suitable filter.

Another object of the present invention is to provide apparatus for frying food products which does not need to be moved from its use location in order to drain the oil from its basin.

A further object of the invention is to provide an apparatus for frying food products which includes a stable container attached to the apparatus, thus avoiding any spillages while filtering or changing the oil.

A further object of the invention, and not the least important, is to provide an apparatus for frying food products which allows the oil held in the basin to be drained at a speed compatible with the filtering speed of the oil into the container.

SUMMARY OF THE INVENTION

According to the present invention there is provided apparatus for frying food products comprising a casing including a basin for holding oil for frying the food product. The apparatus includes draining means for draining the oil from said basin and collecting means for collecting the oil drained from the basin.

BRIEF DESCRIPTION OF THE DRAWING

Further characteristics and advantage can be better seen from the detailed description of embodiments of apparatus for frying food products made accordance with the invention illustrated, by way of example only, in the accompanying drawings, in which:

FIG. 1 is a perspective view of an apparatus in which the drawer for holding the oil container is partially open;

FIG. 2 is a perspective view of the drawer of the apparatus completely open and supporting the container used to collect the oil draining from the basis of the fryer;

SPECIFIC DESCRIPTION

Figure 3:
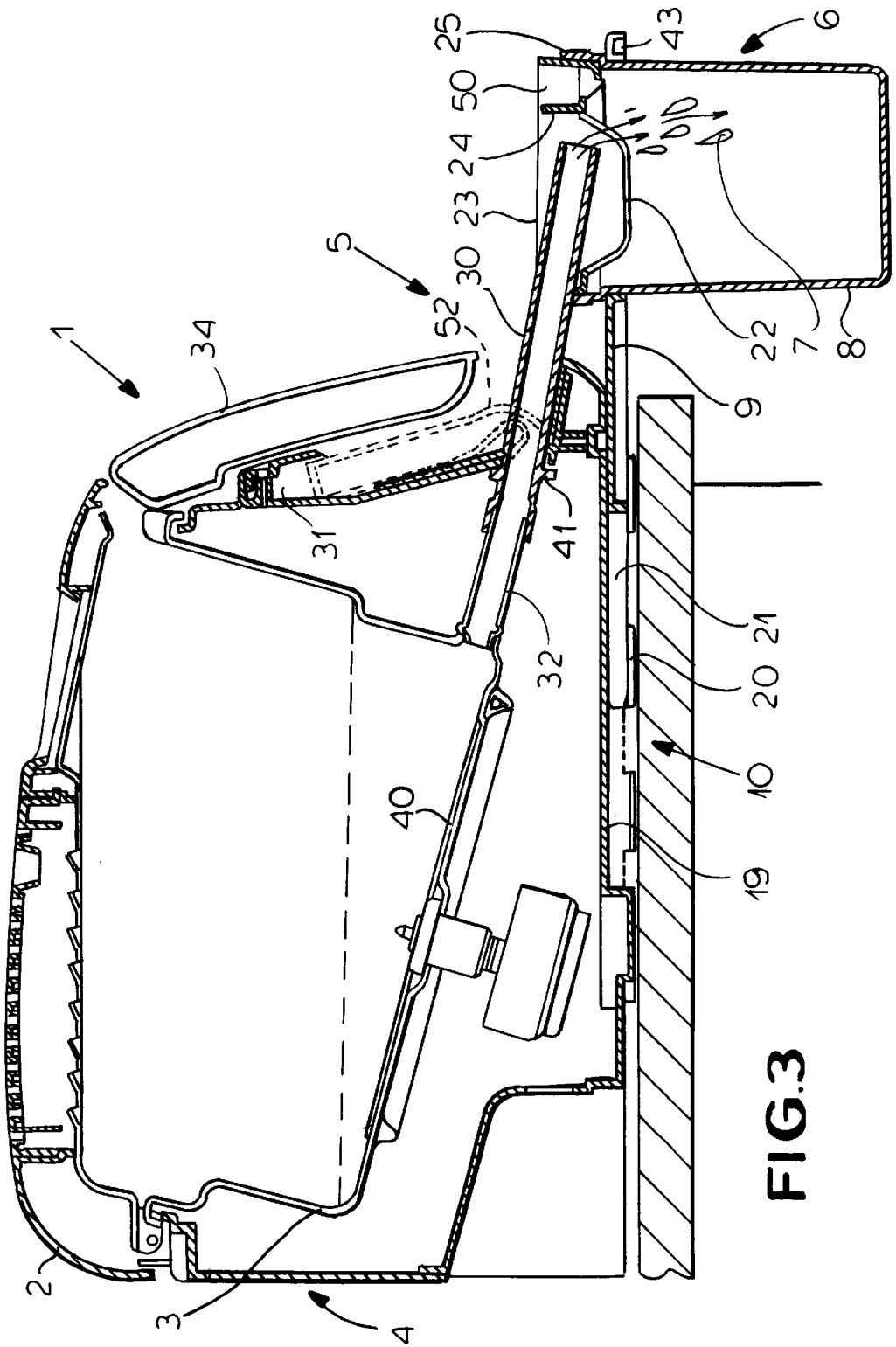
FIG. 3 is a sectional side elevation view showing the apparatus during the drainage of the oil from the internal basin to the container.
Figure 4:
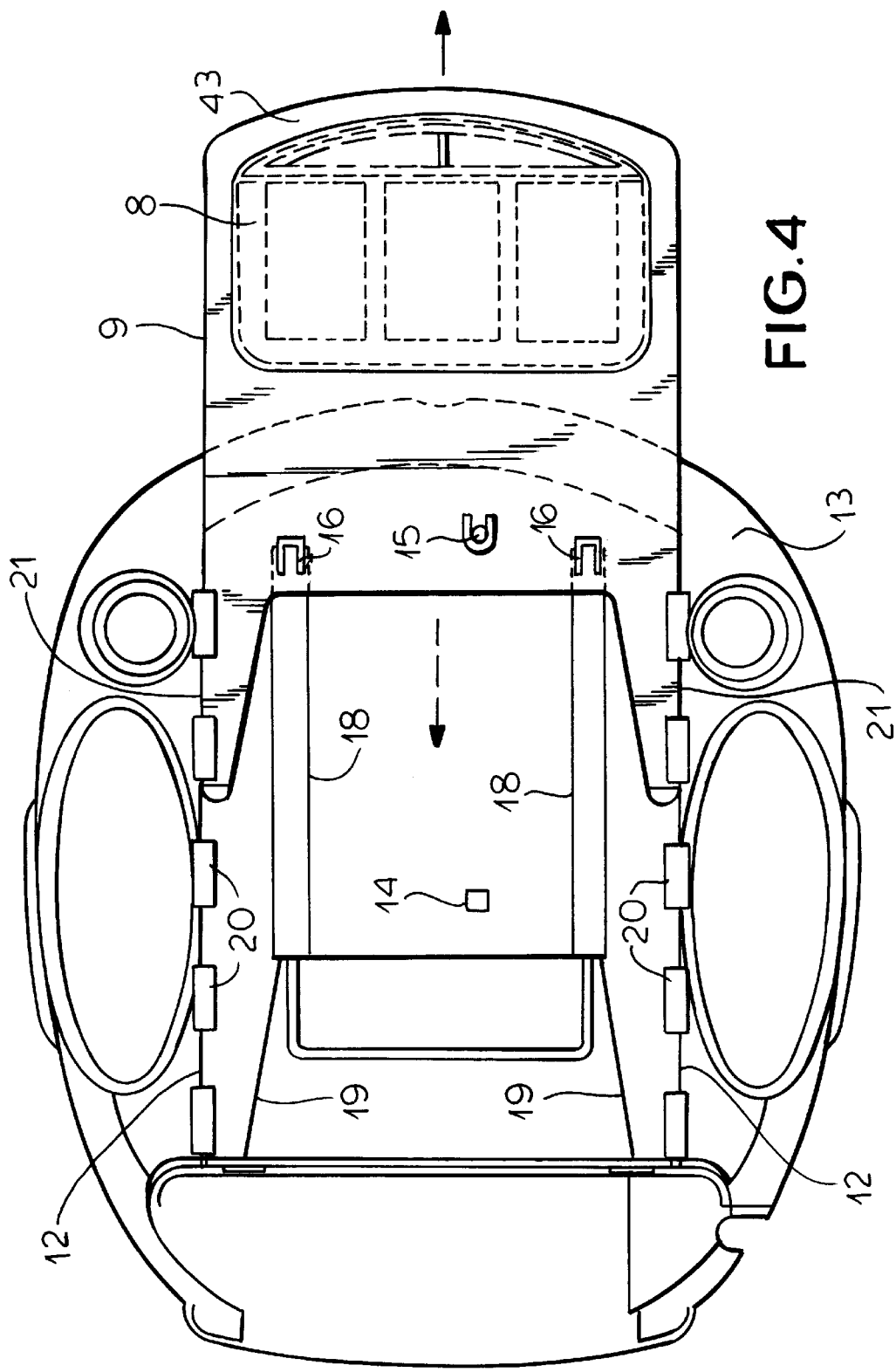
FIG. 4 is an underneath view of the apparatus showing the container support drawer totally open.

An apparatus for frying food products in accordance with the invention, indicated generally by reference numeral 1, comprises a casing, indicated generally by references numeral 4, within which there is located a basin 3 for holding oil 7 for frying the food product.

The casing 4 is equipped with a lid 2 on top, to permit access to the basin 3.

The apparatus further comprises means for draining the oil from the basin 3, indicated generally by reference numeral 5, and collecting means 6 for collecting the oil 7 drained from the basin 3.

In particular, the collecting means 6 for the oil 7 comprises a container 8 removably attached to the casing 4 of the apparatus.

More specifically, the container is supported externally of the casing 4 by a support member defined by a drawer 9, slidably mounted on the casing 4 of the fryer on sliding means indicated by reference numeral 10.

The drawer 9 has an opening 11, within which the container 8 is supported.

The sliding means 10 are defined by at least two guides 12, fixed on a underside 13 of the casing 4 which allow the opening or complete closing of the drawer 9 in the casing 4.

In particular, the sliding means 10 include a first locking element for preventing sliding of the drawer while in the totally closed position, the locking element consisting of a spring tongue 15 integral with the drawer 9, which engages an opening 14 integral with the underside 13 of the apparatus 1.

The sliding means also include a second locking element for preventing sliding of the drawer 9 while in the open position, which consists of two spring tongues 16 slidable within two respective channels 18 formed on the underside 13 of the casing 4. The two guides 12 consist of an reduced area 19 on which the drawer 9 runs and ledges 20 adapted to allow the drawer 9 to slide and also hold it to the underside 13 of the apparatus 1.

Both the raised tongues 16 and wings 21 formed on the drawer 9, allow the drawer 9, both in the totally open position and in the totally closed position relative to the underside 13 of the apparatus, to be always perfectly guided and avoid any veering or wedging of the drawer 9 itself, which would make the movement of the drawer 9 very difficult for the user.

The container 8 includes a filter 22 for filtering the oil 7 drained from the basin 3, as is better explained below.

The filter 22 comprises a frame 23 allowing it to be removably fitted to the container 8 and has a baffle 24 which directs the oil into the filter 22 and subsequently into the container 8 avoiding any splashes or unwanted spillages of oil 7 during the drainage procedure.

The container 8 has an enlarged upper part 25 defining a step which engages the edges of the opening 11 in the drawer 9 and, at the same time, provides an internal support for the frame 23 of the oil filter 22.

The drainage means 5 are defined by a transport member for the oil, one end of which connects with the basin 3 and the other end of which opens into the container 8.

In particular, the transport member consists of a tube is 30 made of elastically deformable material such that it can be folded within a recess 31 formed in the casing 4 of the apparatus 1.

The tube 30 is connected to the basin 3 by means of a metal conduit 32 integral with the basin 3 of the apparatus 1.

The conduit 32 also allows the dissipation of any heat build up that may accumulate in the basin 3 to avoid the heat damaging the elastically deformable tube 30.

The recess 31 in the casing 4 of the apparatus 1 is conveniently accessible through a panel 34 attached to the casing 4 and can be positioned manually by the operator during the filtering or draining of the oil 7 from the basin 3.

The tube 30 can be positioned in the lowermost part of the basin 3 both when the basin 3 has a base parallel to the base of the casing 4 of the apparatus 1 or when, as illustrated in FIG. 3, the base 40 of the basin is angled with respect to the base 13 of the casing 4 of the apparatus 1.

In this second case, the tube 30 is inclined to the base 13 of the casing 4 slopes away at the same angle as is the base 40 of the basin 4 and is provided with an annular collar 41 adapted to prevent the tube 30 detaching itself from the conduit 32.

Opening of the drawer 9 is facilitated by the presence of a lip 43 formed on its outer edge.

The operation of the apparatus for frying food products in accordance with the invention will now be described.

When filtering the oil, the drawer 9 is withdrawn from the casing 4 of the apparatus 1 and the container 8 placed into the opening 11.

The filter 22 is placed into the container 8 the placing and removal of this filter from the container being facilitated by the directing baffle 24, which also acts as a grip for the frame 23 of the filter 22.

At this stage, after having opened the panel 34, the tube 30 is extracted from its housing 31 such that the tube substantially lies above the filter 22, allowing a controlled flow of oil 7 from the basin 3, as a function of the filtering speed of the filter 22.

Once the operation has been completed, the tube 30 can be replaced into the recess 31 and the container 8 conveniently removed from the drawer 9, which can then be closed.

When the oil is being changed, the above mentioned steps are repeated with the exception of inserting the filter 22 into the container 8. As can be determined, the directing baffle 24 is slightly lower than the upper wall of the frame 23 of the filter 22 and forms a passage 50, which leads directly into the container 8.

In this way should the filter 22 become blocked and the oil starts to overflow the frame 23 of the filter, there will be preferential flowing of the oil to the side of the baffle 24 so as to pass directly through the passage 50 into the container 8, by-passing the filter 22.

In use, the, apparatus for frying food products, according to the invention, is extremely simple and at the same time allows the oil to be drained from the basin without any inconvenience and with total safety.

The tube 30 can also have at one end a plug or a small tap for opening and closing the flow of oil, in place of the closure obtained by a fold 52 when the tube is folded into its recess 31.

In use, the materials employed and the dimensions can be varied in accordance to requirements and the state of the technology.

Modifications and improvements can be incorporated without departing from the scope of the invention.

What is claimed is:

1. An apparatus for frying food products comprising:
   a casing
   a basin in said casing for holding oil for frying a food product;
   draining means connected to said basin for draining said oil from said basin; and
   collecting means connected to said casing for collecting said oil drained from said basin, said collecting means comprising
   a sliding drawer slidably attached to said casing through sliding means, said drawer having an opening and
   a container removably receivable in said opening and retained by said drawer to collect oil from said draining means.

2. The apparatus defined in claim 1 wherein the sliding means consists of guide means on an underside of said casing, a first locking element for preventing sliding of said drawer in its fully open position and a second locking element for preventing sliding of said drawer in its closed position.

3. The apparatus defined in claim 1, further comprising a filter to filter said oil in said container.

4. The apparatus defined in claim 3 wherein said filter comprises a frame removably attached to said container, said frame having a baffle for directing said oil into said filter and said container.

5. The apparatus defined in claim 4 wherein said container has an enlarged upper part, which defines a step adapted to engage the edges of the opening in said drawer, and to define a support within said container for said frame of said filter.

6. The apparatus defined in claim 1 said draining means comprises a transport member for draining said oil from said basin to said container.

7. The apparatus defined in claim 6 wherein said transport means has one end which communicates with said basin and has a free end which communicates with said container.

8. The apparatus defined in claim 6 wherein said transport means comprises a tube made of an elastically deformable material adapted to be folded into a recess formed in said casing.

9. The apparatus defined in claim 8 wherein said recess is accessible through a panel on said casing.

10. The apparatus defined in claim 8 wherein said basin has an angled base and that said tube in a position for draining of said oil has an inclination substantially parallel to said base.

11. The apparatus defined in claim 8 wherein said tube has, on a part of said tube within said casing, an annular collar to prevent detachment.

12. The apparatus defined in claim 11 wherein said drawer is provided with an indentation acting as a grip.

* * * * *